United States Patent

Ichikawa et al.

[11] Patent Number: 5,838,504
[45] Date of Patent: Nov. 17, 1998

[54] PRISM AND REAL IMAGE TYPE VIEW FINDER

[75] Inventors: Yuichi Ichikawa; Sachio Hasushita; Ryouzi Sekiguchi, all of Tokyo, Japan

[73] Assignee: Asahi Kogaku Kogyo Kabushiki Kaisha, Tokyo, Japan

[21] Appl. No.: 624,776

[22] Filed: Mar. 27, 1996

Related U.S. Application Data

[63] Continuation of Ser. No. 233,431, Apr. 28, 1994, abandoned.

[30] Foreign Application Priority Data

Apr. 27, 1993 [JP] Japan ................................. 5-100750

[51] Int. Cl.$^6$ ............................. G02B 5/054; G03B 13/02
[52] U.S. Cl. ........................ 359/834; 359/835; 359/431; 396/384
[58] Field of Search .................................. 359/831, 833, 359/834, 835, 837, 900, 431, 599, 636, 640, 726; 385/36, 37; 354/199, 200, 207, 478, 154, 219, 220, 225

[56] References Cited

U.S. PATENT DOCUMENTS

| | | | |
|---|---|---|---|
| 2,275,602 | 3/1942 | Beck et al. ................................ | 359/599 |
| 3,443,871 | 5/1969 | Chitayat .................................. | 359/640 |
| 3,484,715 | 12/1969 | Rempel .................................... | 359/831 |
| 4,081,807 | 3/1978 | Urano et al. ............................. | 359/636 |
| 4,114,983 | 9/1978 | Maffitt et al. ........................... | 359/599 |
| 4,119,980 | 10/1978 | Baker ...................................... | 354/154 |
| 4,208,115 | 6/1980 | Proske ..................................... | 354/219 |
| 4,509,848 | 4/1985 | Katsuma et al. ......................... | 354/478 |
| 4,544,256 | 10/1985 | Momiyama et al. ..................... | 354/478 |
| 4,556,932 | 12/1985 | Lehrer et al. . | |
| 4,583,820 | 4/1986 | Flamand et al. ......................... | 385/37 |
| 4,643,519 | 2/1987 | Bussard et al. .......................... | 385/37 |
| 4,785,980 | 11/1988 | Miller et al. . | |
| 4,791,700 | 12/1988 | Bigley et al. . | |
| 4,819,224 | 4/1989 | Laude ...................................... | 385/37 |
| 4,924,084 | 5/1990 | Lask et al. .......................... | 250/227.25 |
| 5,035,486 | 7/1991 | Inokuchi . | |
| 5,095,326 | 3/1992 | Nozaki et al. ........................... | 359/831 |
| 5,122,217 | 6/1992 | Sugahara . | |
| 5,134,526 | 7/1992 | Inabata .................................... | 359/726 |
| 5,137,032 | 8/1992 | Harmon . | |
| 5,233,475 | 8/1993 | Oshita ..................................... | 359/836 |
| 5,245,469 | 9/1993 | Goto ....................................... | 359/837 |

FOREIGN PATENT DOCUMENTS 0211469 2/1987 European Pat. Off. .................. 385/37

Primary Examiner—Ricky D. Shafer
Attorney, Agent, or Firm—Greenblum & Bernstein, P.L.C.

[57] ABSTRACT

A prism is provided having a surface on which light is made incident, surfaces at which light is reflected and a surface from which light is emitted. The prism includes an uneven surface portion provided on at least one of the incident, reflecting or emitting surfaces and located outside a light transmission area through which effective light of an associated optical system, in which the prism is to be incorporated, can be transmitted. The disclosure is also directed to a real image type view finder having such a prism.

5 Claims, 13 Drawing Sheets

PRISM AND REAL IMAGE TYPE VIEW FINDER

This application is a continuation of application Ser. No. 08/233,431, filed Apr. 28, 1994, now abandoned.

BACKGROUND OF THE INVENTION

1. Field of the Invention

The present invention relates to a prism provided in an optical path of a real image type view finder for deflecting the optical path.

2. Description of Related Art

In a known real image type view finder, an intermediate image (i.e., real image) of an object to be photographed is formed by an objective optical system and is viewed through an ocular optical system. The intermediate image is inverted in the vertical and horizontal directions by an image erecting optical system which is provided in the optical path. The image erecting optical system usually includes a Porro prism or a modified prism. If extraneous (i.e., harmful) light is incident upon the prism, the light will be reflected by an incident surface, an emitting surface or a reflecting surface of the prism, resulting in an undesirable internal reflection.

SUMMARY OF THE INVENTION

The primary object of the present invention is to provide a simple apparatus which can easily prevent such a harmful internal reflection from occurring in a real image type view finder having a prism.

To achieve the object of the present invention, according to the basic concept of the present invention, an incident surface, reflecting surfaces, and an emitting surface of a prism that have conventionally been entirely constructed as smooth surfaces, are partly made of an uneven surface (i.e., a rough surface having fine depressions and projections) by which light is scattered, i.e., a surface portion that causes a diffused reflection. Namely, according to the present invention, surface portions of the prism that are located outside of the effective reflecting surface portions, on which light to be imaged is reflected, are made of an uneven surface to prevent an occurrence of an internal reflection of harmful light.

According to the present invention, there is provided a real image type view finder including a prism located in an optical path of the finder having a surface on which light is made incident, surfaces at which light is reflected, and a surface from which light is emitted, including an uneven surface portion provided on at least one of the incident, reflecting or emitting surfaces of the prism and located outside a light transmission area through which effective light of an associated optical system, in which the prism is to be incorporated, can be transmitted.

The present invention is generally addressed to a prism which can be used in an optical apparatus other than a real image type view finder. Namely, according to the present invention, a prism is provided which has a surface on which light is made incident, surfaces at which light is reflected and a surface from which light is emitted. The prism includes an uneven surface portion provided on at least one of the incident, reflecting and emitting surfaces and located outside a light transmission area through which effective light of an associated optical system, in which the prism is to be incorporated, can be transmitted.

The uneven surface portion scatters harmful light incident thereupon. Accordingly, an internal reflection, which would be otherwise caused by the harmful light, does not occur. Thus, no harmful light reaches a viewer's eye or a photosensitive material.

Preferably, the prism is made by an injection molding process. In the injection molding process, a molding die, having an uneven surface portion corresponding to the uneven surface portion of at least one of the incident, reflecting or emitting surfaces of the prism, can be used.

Preferably, the unevenness of the uneven surface is about 12.5 S to 200 S (JIS).

Note that the effective light (i.e., light for imaging) refers to light whose aberration is compensated upon design of an associated optical system and which is intended to be correctly and effectively received by the prism or the associated optical system. In general, the range of the effective light (i.e., light transmission area) is defined by a light intercepting frame or a peripheral surface of the lens, etc. On the other hand, harmful light which causes an undesirable internal reflection is produced, for example, by a manufacturing error of an optical element. In particular, in case of a zoom finder, when a large amount of light is made incident from the outside of the real field of view upon the front surface of the objective optical system at a high magnification, harmful light tends to occur.

The present disclosure relates to subject matter contained in Japanese Patent Application No. HEI 5-100750 (filed on Apr. 27, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 6:
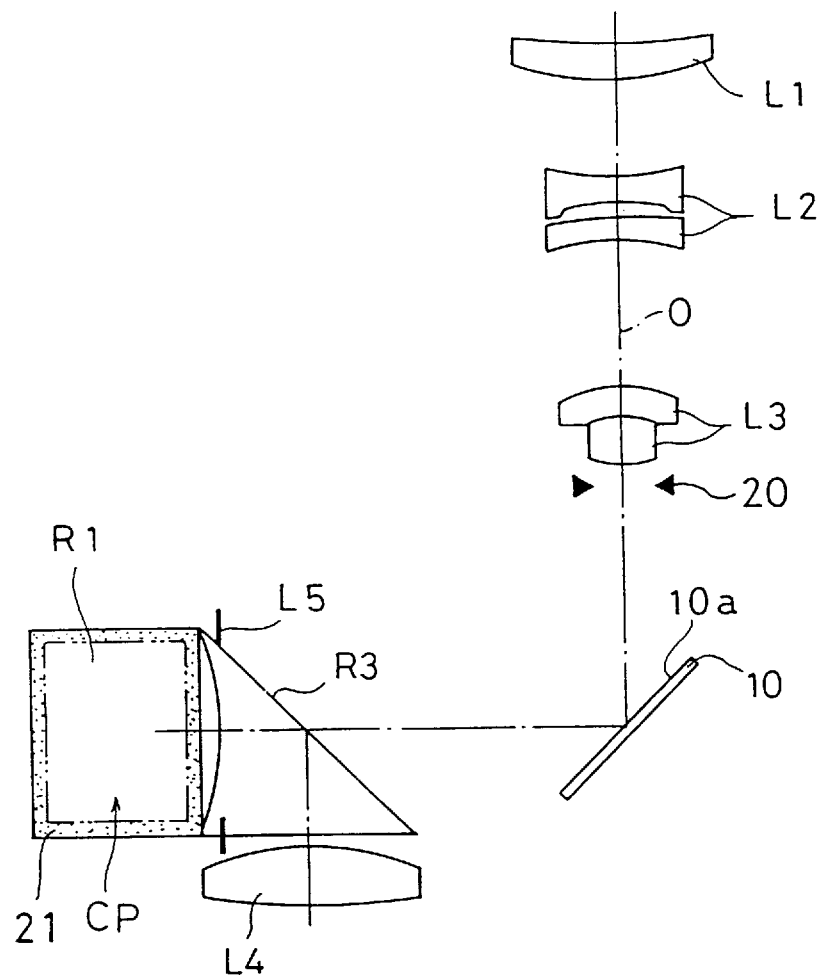
FIG. 6 is a plan view of a real image type view finder according to the present invention.
Figure 7:
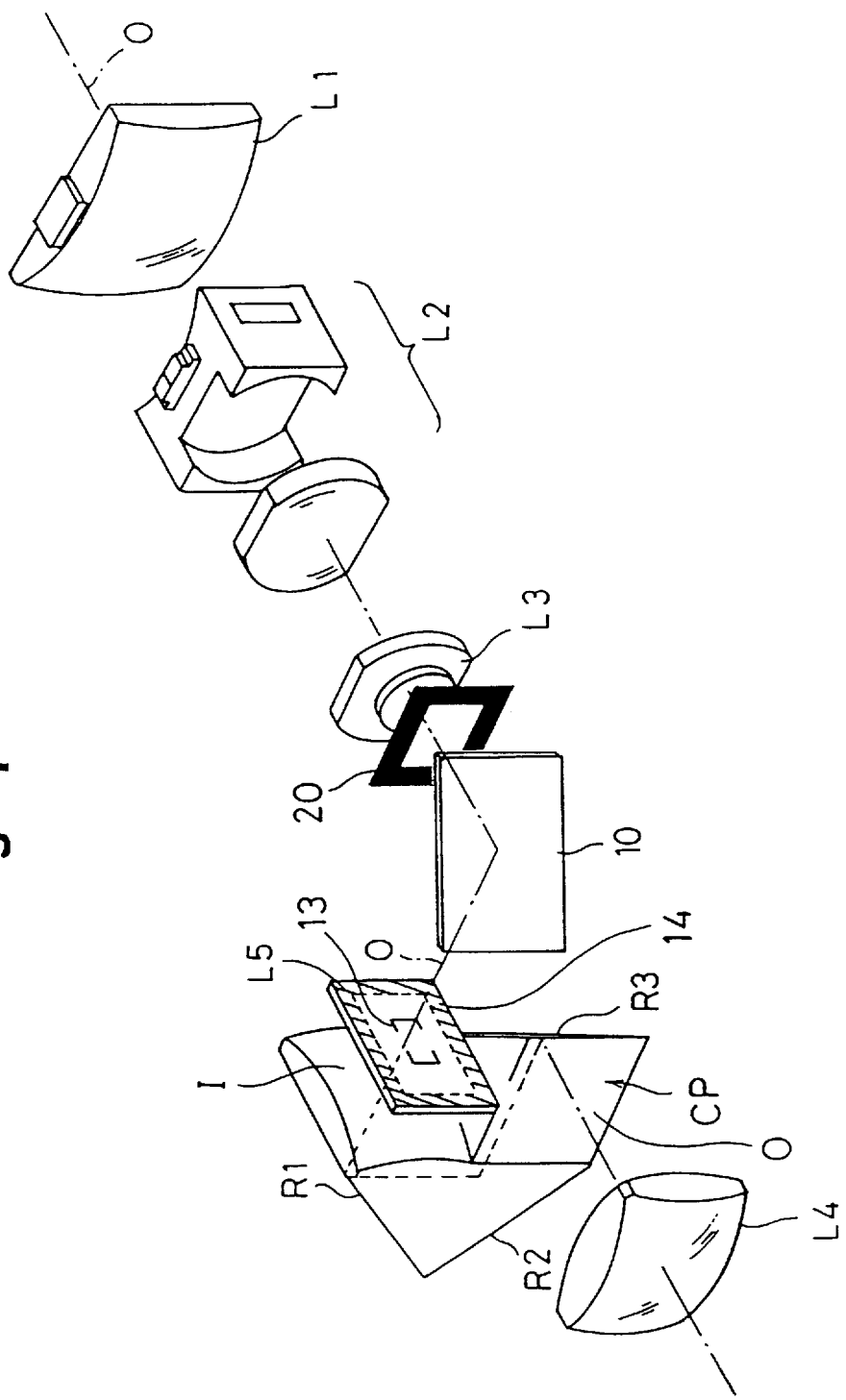
FIG. 7 is an exploded isometric view of a real image type view finder shown in FIG. 6.

FIGS. 6 and 7 show an example of an optical system of a real image type zoom finder, according to the present invention. The optical system includes a first lens group L1, a second lens group L2, a third lens group L3, a reflecting mirror 10, a glass field frame L5, a compound lens prism CP, and a fourth lens group L4, arranged in this order from the object side. The objective optical system which is constituted by the first lens group L1, the second lens group L2, the third lens group L3, and the reflecting mirror 10 forms a real image of an object to be photographed on the field frame plate L5. In the objective optical system, the second lens group L2 and the third lens group L3 are movable and constitute a zoom optical system. In the zoom optical system, a light intercepting frame 20, which defines an effective light transmission area of a bundle of rays, is provided behind the third lens group L3. In other words, the bundle of rays transmitted through the objective optical system which are to be imaged, are restricted by the light intercepting frame 20. The field frame plate L5 is provided with a field frame 14 as well as a distance measuring mark 13.

The compound lens prism CP includes a prism having first, second and third reflecting surfaces R1, R2 and R3. There are four reflecting surfaces in total that constitute an image erecting optical system, including the first, second and third reflecting surfaces R1, R2 and R3, and the reflecting mirror 10. The object image which has been formed erect by the image erecting optical system can be viewed through an ocular optical system including the compound lens prism CP and the fourth lens group L4. The compound lens prism CP is made of three right angle prisms having the three reflecting surfaces R1, R2 and R3. The incident surface I of the compound lens prism CP is in the shape of a lens. The emitting surface O of the compound lens prism CP is flat. It is also possible to provide a prism having a flat incident surface I. In this alternative, a separate lens corresponding to the incident surface I in FIGS. 6 and 7 is provided.

Each of the three reflecting surfaces R1, R2 and R3 of the compound lens prism CP is provided, on a peripheral surface thereof, with an uneven portion 21 (i.e., a portion of the reflecting surface having fine depressions and projections). The uneven portions 21 are provided outside of the effective light transmission area 12 that is defined by the light intercepting frame 20. Portions of the reflecting surfaces R1, R2 and R3 other than the uneven surface portions 21 are flat, similar to a conventional prism. The uneven portions 21 are made sufficiently uneven (i.e., rough) to scatter or diffuse light incident thereupon so that extraneous (i.e., harmful) light does not reach the fourth lens group L4. Accordingly, extraneous light incident upon the uneven surface portions 21 will not be incident upon the viewer's eye. Preferably, the surface roughness of the uneven portions 21 is tens or hundreds of times the wavelength band to be used, for example, 12.5 S~200 S ("S" is defined in the JIS B 0601- Definitions and Designation of Surface Roughness, and designates the maximum allowable value of the highest projection).

Figure 9:
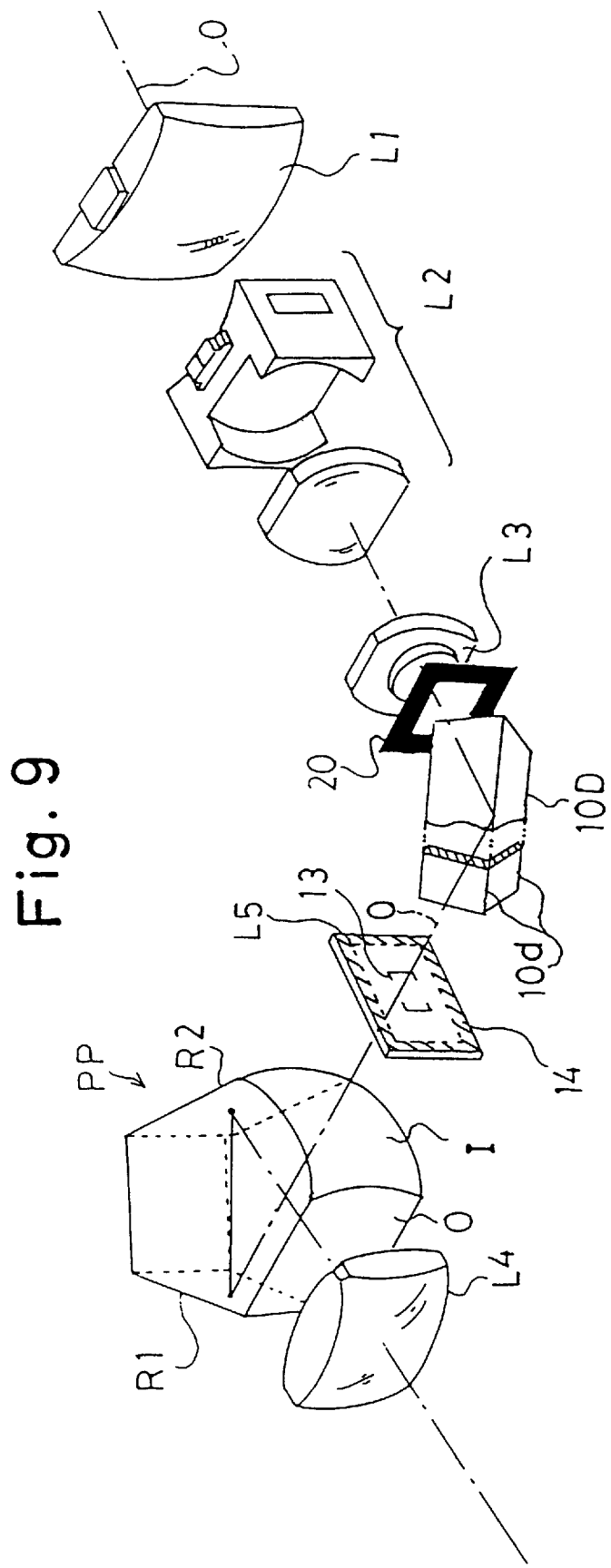
FIG. 9 is an exploded isometric view of a real image type view finder having a pentagonal prism to which the present invention is applied.
Figure 10:
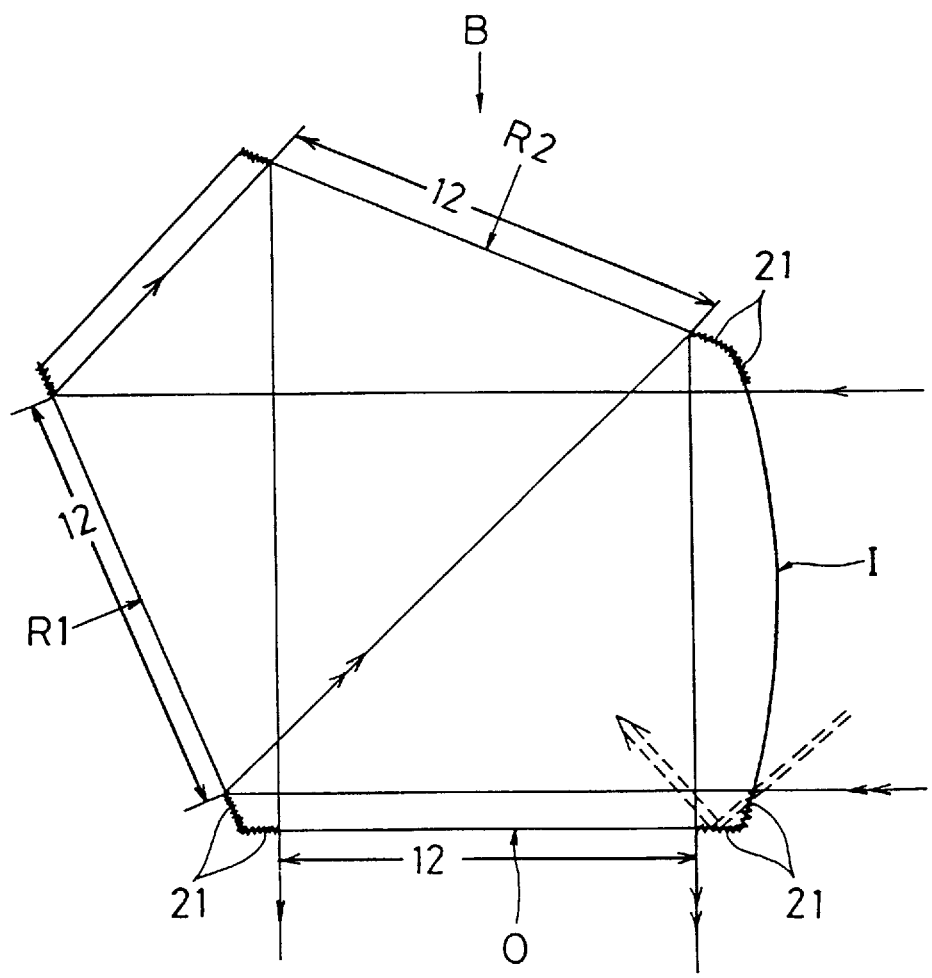
FIG. 10 is a plan view of the pentagonal prism shown in FIG. 9.
Figure 11:
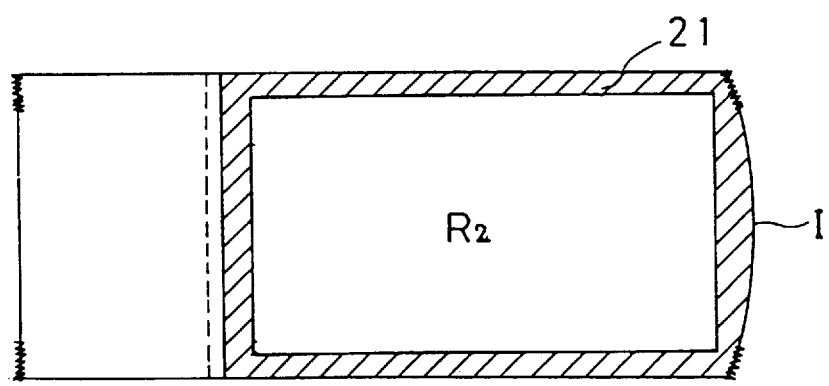
FIG. 11 is a view of a prism surface from a direction indicated by an arrow B in FIG. 10.

FIGS. 9 to 11 show an embodiment of a real image type of finder optical system including a pentagonal prism PP to which the present invention is applied. FIG. 9 is an exploded isometric view of the real image type of finder optical system. In FIG. 9, components similar to those of FIG. 7 are designated with the same reference numerals. In the finder optical system, a daha mirror 10D and a pentagonal prism PP are used instead of the mirror 10 and the compound prism CP shown in FIG. 7, respectively. The daha mirror 10D includes two reflecting surfaces 10d which are normal to each other. The pentagonal prism PP includes an incident lens surface I, two reflecting surfaces R1 and R2 and an emitting surface O. Uneven portions 21 are formed on at least one of the reflecting surfaces R1 and R2 and the emitting surface O outside the effective light transmission area 12. The incident surface I may be formed as a flat surface.

If the compound lens prism CP is made of plastic (e.g., synthetic resin), the uneven surface portions 21 can be easily obtained in a conventional molding process by the use of a molding die having a molding surface that corresponds to the uneven surface portions 21.

Figure 12:
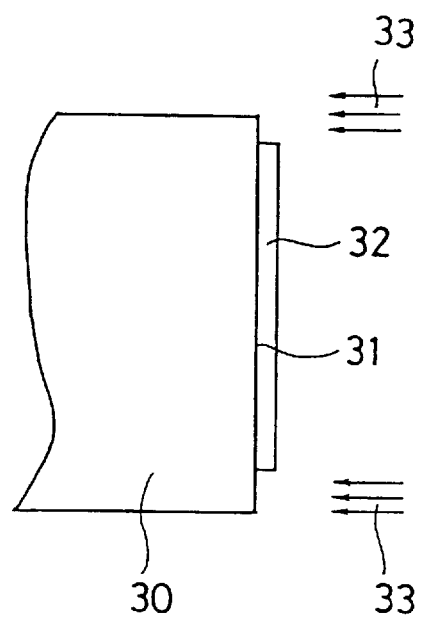
FIG. 12 is a schematic sectional view of a molding die which is adapted to make a prism according to the present invention.

FIG. 12 shows such a molding die (i.e., injection molding die) 30 which can be used to mold a plastic compound lens prism CP. A molding surface 31 of the molding die 30, which is for molding the reflecting surface portions R1, R2 or R3, is first polished to obtain a reflecting surface, and is then covered by a masking member 32 corresponding to the effective light transmission area 12 of the reflecting surface R1, R2 or R3. Thereafter, the exposed peripheral surface portion of the reflecting surface 31 of the molding die 30, that is located outside the masking member 32, is subject to a shot-peening process using fine particles, as indicated by an arrow 33 in FIG. 11. Consequently, an uneven peripheral surface portion of the reflecting surface 31 of the molding die 30 is formed. Using the molding die 30 thus obtained, synthetic resin prisms having uneven surfaces 21 can be much more easily and inexpensively mass-produced than glass prisms.

In the real image type view finder, as constructed above, if harmful light is incident upon the uneven portions 21 of the reflecting surface(s) R1, R2 and/or R3, the light is scattered or diffused thereby. Consequently, no internal reflection occurs and a clear object image can be viewed through the view finder according to the present invention.

Figure 1:
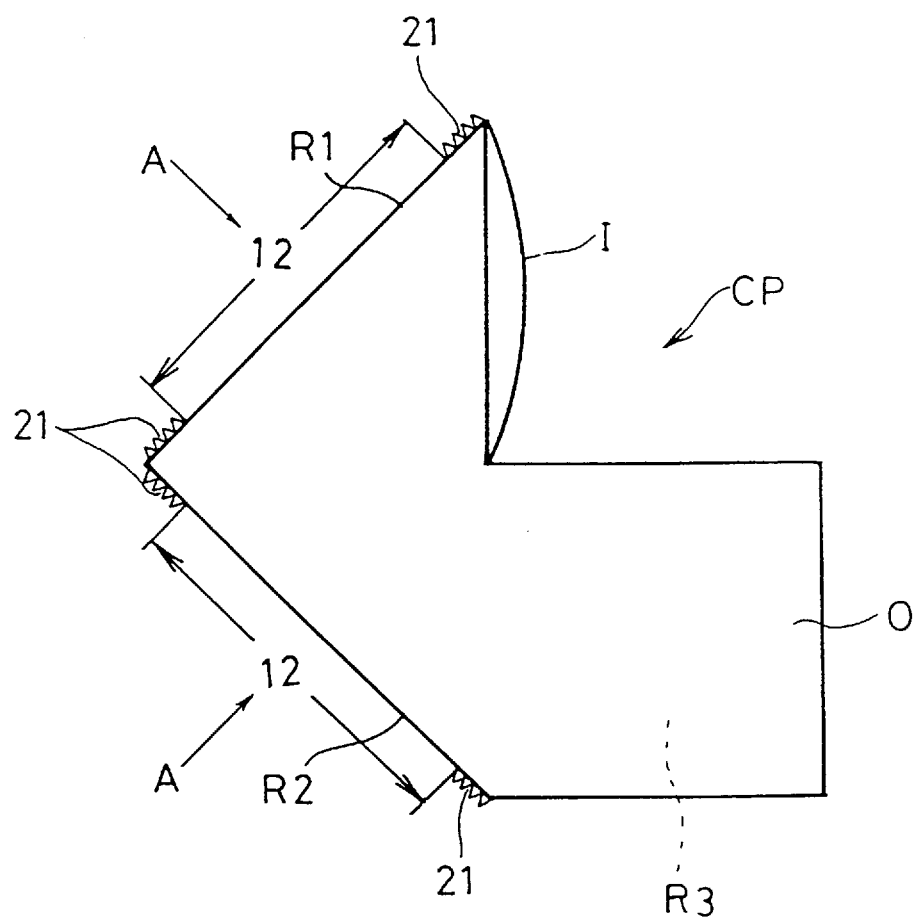
FIG. 1 is a back view of a compound prism provided in a real image type view finder according to the present invention.
Figure 2:
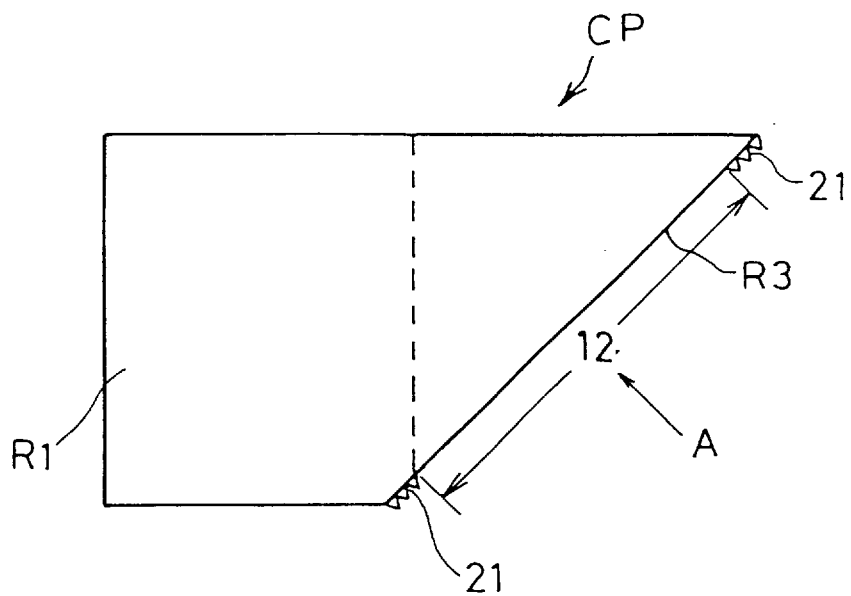
FIG. 2 is a bottom view of the compound prism shown in FIG. 1.
Figure 3:
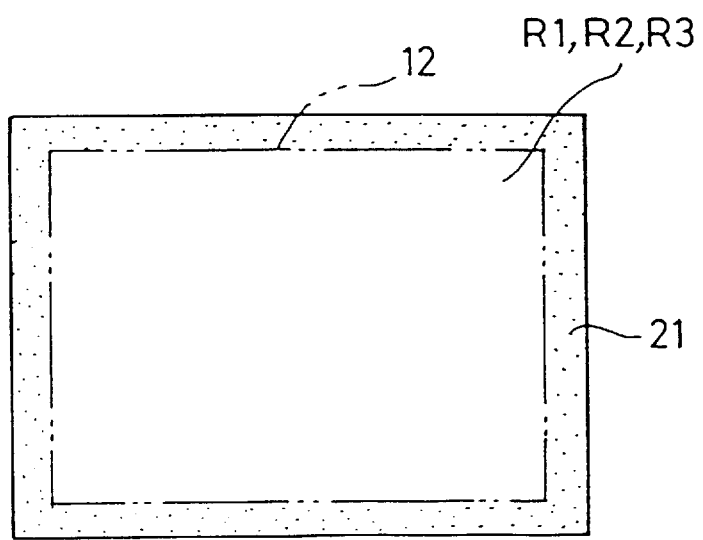
FIG. 3 is a view of a prism surface from a direction indicated by an arrow A in FIGS. 1 and 2.
Figure 4:
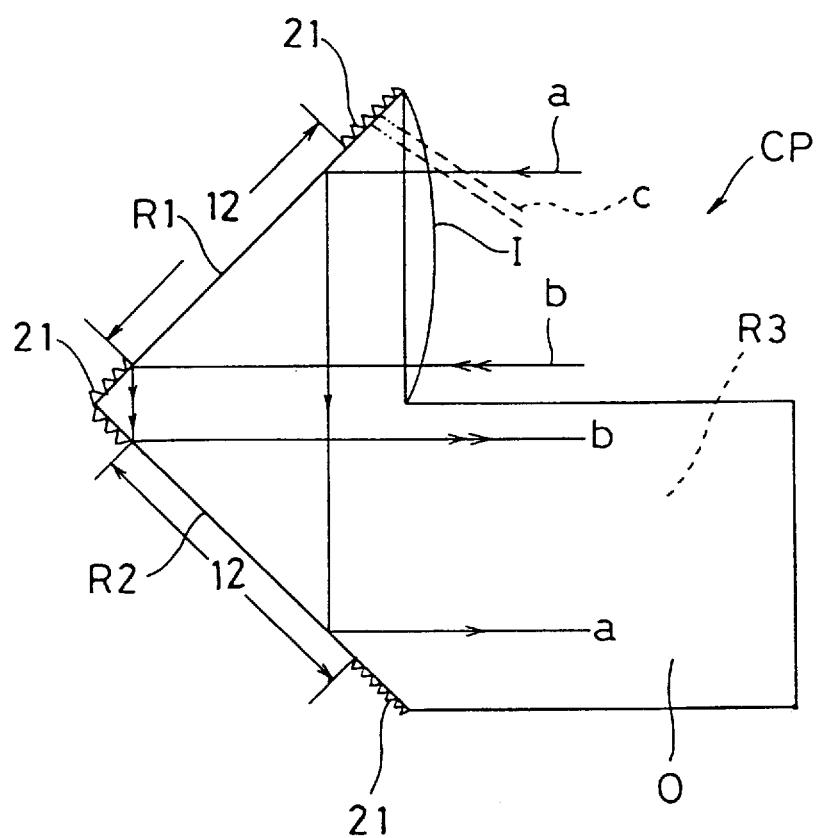
FIG. 4 is a schematic view of an optical path in a compound prism in which no internal reflection of harmful light occurs according to the present invention.
Figure 5:
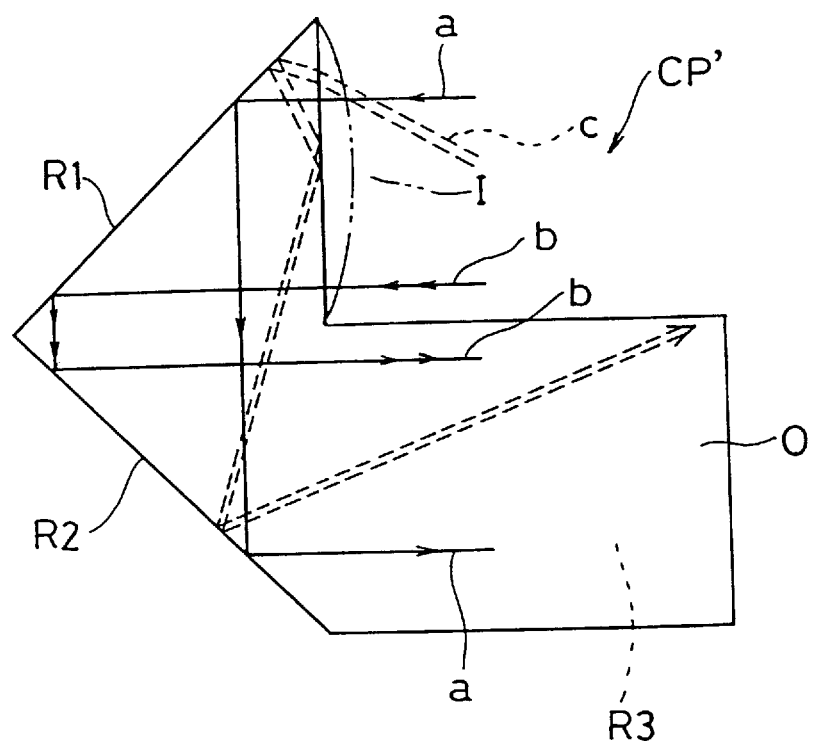
FIG. 5 is a schematic view of an optical path in a known compound prism in which an internal reflection of harmful light occurs.

With reference to FIG. 4, it can be understood that no internal reflection takes place in the compound lens prism CP of the present invention in which the reflecting surfaces R1, R2 and R3 are provided with the uneven surface portions 21, in comparison with a conventional compound prism CP' whose incident, reflecting and emitting surfaces are all flat, as shown in FIG. 5. In FIGS. 4 and 5, the effective light transmission area is defined by light "a" (solid line) and light "b" (solid line). Since incident harmful light "c" (indicated by phantom lines) outside the effective light transmission area is diffused or scattered by the associated uneven surface portion 21, no internal reflection occurs in the present invention. However, in the prior art, as may be seen in FIG. 5, the harmful light "c" is reflected by the peripheral surface portion of the reflecting surface of the prism, the reflected light can be reflected and refracted by other reflecting surface(s) of the prism, as indicated by phantom lines, thus resulting in an occurrence of an undesirable internal reflection. Note that in FIG. 5, the harmful light "c" is incident upon the flat incident surface I of the prism by way of example.

Although the three reflecting surfaces R1, R2 and R3 are all provided with the uneven surface portions 21 of the compound lens prism CP in the above-mentioned embodiment, it is possible to provide the uneven surface portions 21 on only one or two specific reflecting surfaces which cause the internal reflection. Moreover, it is also possible to provide uneven surface portions on the peripheral surface portions of the incident surface I and/or the emitting surface O of the prism.

Figure 8:
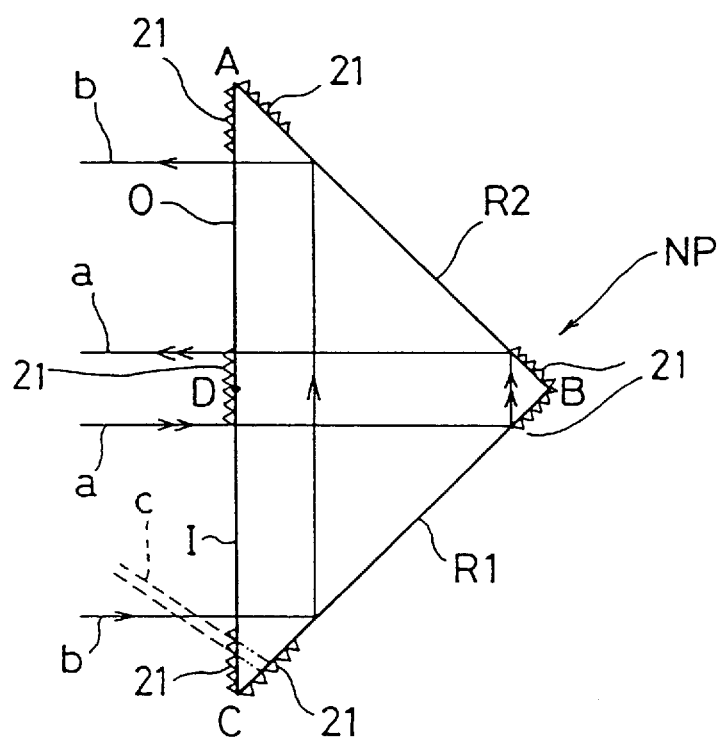
FIG. 8 is a schematic view of an optical path in a right angle prism in which no internal reflection of harmful light occurs according to the present invention.
Figure 13:
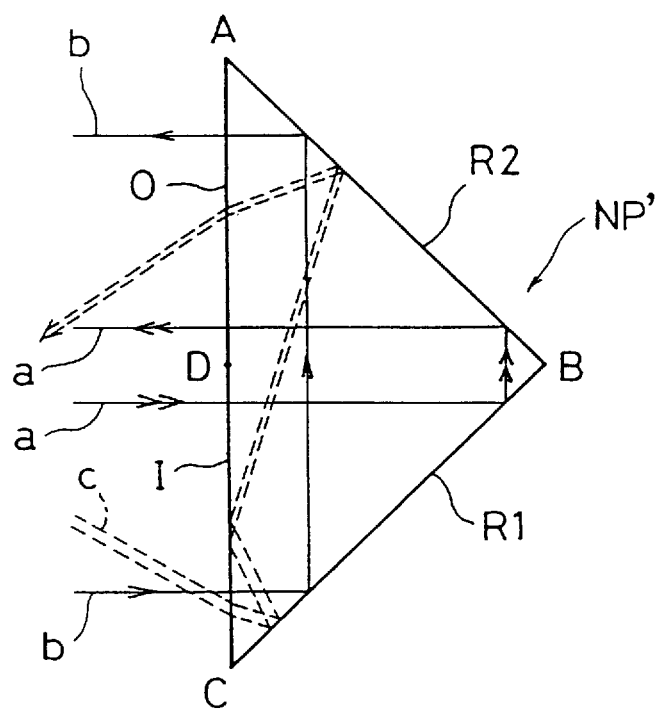
FIG. 13 is a schematic view of an optical path in a known right angle prism in which an internal reflection of harmful light occurs, and, FIG. 14 is a schematic view of an optical path in a known prism having an anti-internal reflection structure.

FIG. 8 shows another embodiment of the present invention which is generally applied to a right angle prism NP. In FIG. 8, the incident surface I, the reflecting surfaces R1 and R2, and the emitting surface O of the prism are provided with the uneven portions 21. FIG. 13 shows a known right angle prism NP' in which the incident surface I, the reflecting surfaces R1 and R2, and the emitting surface O are all flat surfaces. In FIGS. 8 and 13, the effective light transmission area is defined by light "a" (solid line) and light "b" (solid line). As can be seen in FIG. 8, incident harmful light "c" (indicated by phantom lines) outside the effective light transmission area is diffused or scattered by the associated uneven surface portion 21. Thus, no internal reflection occurs in the present invention. On the other hand, in the prior art shown in FIG. 13, the harmful light "c" incident upon the peripheral edge of the reflecting surface outside the effective light transmission area is reflected and refracted by other reflecting surfaces of the prism, as indicated by phantom lines, thus resulting in an occurrence of an undesirable internal reflection.

Although the uneven portions 21 are provided on the incident surface I, the reflecting surfaces R1 and R2, and the emitting surface O of the prism NP, it is possible to provide the uneven portion 21 on only one of incident surface I, reflecting surfaces R1 and R2, or emitting surface O, depending on the extent of the harmful light. Namely, depending on the degree of harmful light, the uneven surface portion(s) 21 can be selectively provided on the surface(s) of the right angle prism NP in the vicinity of the apex A, B or C of the prism NP. Furthermore, it is preferable to coat the outer surfaces of the uneven surface portions 21 by a matting black paint to thereby prevent an internal reflection from occurring.

Figure 14:
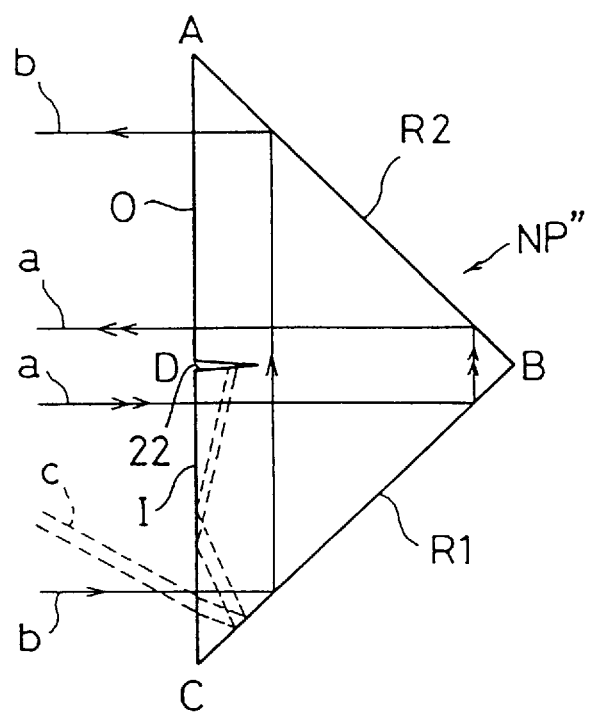

FIG. 14 shows a known anti-internal reflection structure of a right angle prism NP". In FIG. 14, a wedged groove 22 is provided at an intermediate portion D of the incident surface I and the emitting surface O of the prism. Harmful light "c" entering the prism is intercepted by the wedged groove 22. The wedged groove 22 can be painted black.

In the known anti-internal reflection structure as shown in FIG. 10, it is, however, difficult to form the wedged groove 22. In addition, light can be diffused at the front end of the wedged groove 22, resulting in an internal reflection of the diffused light. These problems are eliminated in the present invention in which the uneven surface(s) is (are) merely provided on the outer surface(s) of the prism at a predetermined position. Furthermore, the prisms can be easily mass-produced in the present invention.

As can be understood from the above discussion, according to the present invention, since the uneven surface portion(s) is (are) simply provided on the outside (i.e., peripheral surface) of the effective light transmission area of the prism, no internal reflection caused by harmful light incident upon the prism on the outside of the effective light transmission area occurs.

Although the invention has been described with reference to particular means, materials and embodiments, it is to be understood that the invention is not limited to the particulars disclosed and extends to all equivalents within the scope of the claims.

We claim:

1. A real image type viewfinder including a prism located in an optical path of said real image type viewfinder and having a surface on which light is made incident, surfaces at which light is reflected, and a surface from which light is emitted, said real image type viewfinder comprising:

an objective optical system, an image erecting optical system, and an ocular optical system, arranged in this order from an object side of said real image type viewfinder; and an uneven surface portion provided on at least one of said surface on which said light is made incident, said surfaces at which light is reflected, and said surface from which light is emitted, said prism being molded utilizing a molding die having an uneven surface corresponding to said uneven surface portion, said uneven surface of said molding die being subjected to a shot-peening process, said uneven surface portion being completely located outside a light transmission area through which effective light of an associated optical system, in which said prism is to be incorporated, can be transmitted, wherein said prism comprises at least a part of said image erecting optical system.

2. The real image type viewfinder according to claim 1, wherein unevenness of said uneven portion is about 2.5 S to 200 S (JIS), wherein S ($\mu$m) designates a maximum allowable value of a highest projection.

3. The real image type view finder of claim 1, wherein said prism is made of synthetic resin.

4. The real image type view finder of claim 3, wherein said prism is made by an injection molding process.

5. The real image type view finder of claim 4, wherein said injection molding process uses a molding die having an uneven surface portion corresponding to said uneven surface portion of at least one of said incident, reflecting and emitting surfaces of the prism.

* * * * *

UNITED STATES PATENT AND TRADEMARK OFFICE
CERTIFICATE OF CORRECTION

PATENT NO. : 5,838,504
DATED : November 17, 1998
INVENTOR(S) : ICHIKAWA YUICHI et al.

It is certified that error appears in the above-identified patent and that said Letters Patent is hereby corrected as shown below:

At column 6, line 39 (claim 2, line 2) of the printed patent, "2.5S" should be —12.5S—

Signed and Sealed this

Twentieth Day of June, 2000

Attest:

Q. TODD DICKINSON

*Attesting Officer*   *Director of Patents and Trademarks*

UNITED STATES PATENT AND TRADEMARK OFFICE
CERTIFICATE OF CORRECTION

PATENT NO. : 5,838,504
DATED : November 17, 1998
INVENTOR(S) : ICHIKAWA YUICHI et al.

It is certified that error appears in the above-identified patent and that said Letters Patent is hereby corrected as shown below:

Title page, item [56] References Cited U.S. Patent Documents, (column 2, line 14) of the printed patent, "4,785,980" should be —4,785,950—.

Signed and Sealed this

Twenty-ninth Day of August, 2000

Attest:

Q. TODD DICKINSON

Attesting Officer

Director of Patents and Trademarks